United States Patent
Masters et al.

(10) Patent No.: US 11,452,964 B2
(45) Date of Patent: Sep. 27, 2022

(54) WATER SPRAY FEATURE OF AN APPLIANCE FOR SEPARATING PARTICULATE MATERIAL FROM A FILTER MEMBER

(71) Applicant: WHIRLPOOL CORPORATION, Benton Harbor, MI (US)

(72) Inventors: Roy E. Masters, St. Joseph, MI (US); Arun Rajendran, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 128 days.

(21) Appl. No.: 16/808,788

(22) Filed: Mar. 4, 2020

(65) Prior Publication Data
US 2021/0275957 A1     Sep. 9, 2021

(51) Int. Cl.
| | |
|---|---|
| *F26B 19/00* | (2006.01) |
| *B01D 46/79* | (2022.01) |
| *D06F 58/22* | (2006.01) |

(52) U.S. Cl.
CPC ............ *B01D 46/79* (2022.01); *D06F 58/22* (2013.01); *B01D 2279/55* (2013.01)

(58) Field of Classification Search
CPC .. D06F 58/22; B01D 46/0082; B01D 2279/55
USPC ................................ 34/85, 292, 300, 480, 82
See application file for complete search history.

(56) References Cited

U.S. PATENT DOCUMENTS

| | | | |
|---|---|---|---|
| 2,893,135 A * | 7/1959 | Smith ................... | D06F 58/02 34/610 |
| 3,006,176 A | 10/1961 | Behrens | |
| 3,199,318 A | 8/1965 | Sullivan et al. | |
| 8,789,290 B2 | 7/2014 | Grunert | |
| 9,027,256 B2 | 5/2015 | Kim et al. | |
| 9,797,080 B2 | 10/2017 | Doh et al. | |
| 2006/0123854 A1* | 6/2006 | Hong .................... | D06F 58/22 68/19.1 |
| 2013/0263630 A1* | 10/2013 | Doh ....................... | D06F 37/04 68/20 |
| 2017/0044702 A1 | 2/2017 | Doh et al. | |
| 2018/0171537 A1* | 6/2018 | Lee ........................ | B08B 3/14 |
| 2018/0245272 A1* | 8/2018 | Bocchino .............. | D06F 58/22 |
| 2018/0313015 A1 | 11/2018 | Kim et al. | |
| 2019/0161898 A1 | 5/2019 | Byeon et al. | |
| 2020/0040514 A1 | 2/2020 | Bombardieri | |

FOREIGN PATENT DOCUMENTS

| | | |
|---|---|---|
| EP | 2039819 | 3/2009 |
| KR | 20140102169 | 8/2014 |

* cited by examiner

*Primary Examiner* — John P McCormack
(74) *Attorney, Agent, or Firm* — Price Heneveld LLP (57) ABSTRACT

A laundry appliance includes a tub having a rear wall. A drum is rotationally operable within the tub. An air flow path extends through an air flow port defined within the rear wall. A lint filter is positioned within the air flow port. A fluid spray system extends through the rear wall and directs a flow of fluid over the air flow port and the lint filter in a direction generally parallel with an inside surface of the rear wall.

13 Claims, 7 Drawing Sheets

WATER SPRAY FEATURE OF AN APPLIANCE FOR SEPARATING PARTICULATE MATERIAL FROM A FILTER MEMBER

BACKGROUND OF THE DISCLOSURE

The present disclosure generally relates to consumer appliances, and more specifically, to a laundry appliance having a water spray feature that is used to separate particulate material from a particulate filter of the laundry appliance.

SUMMARY OF THE DISCLOSURE

According to one aspect of the present disclosure, a laundry appliance includes a tub having a rear wall. A drum is rotationally operable within the tub. An air flow path extends through an air flow port defined within the rear wall. A lint filter is positioned within the air flow port. A fluid spray system extends through the rear wall and directs a flow of fluid over the air flow port and the lint filter in a direction generally parallel with an inside surface of the rear wall.

According to another aspect of the present disclosure, a laundry appliance includes a tub that defines a laundry treatment space and includes a rear wall. An air flow path extends from the tub and through an air flow port defined within the rear wall of the tub. A lint filter is disposed within the air flow path that entraps particles of lint. A fluid spray system extends through the rear wall and directs a flow of fluid along an inside surface of the rear wall and across a surface of the lint filter to separate particles of lint from the lint filter and dispose the particles of lint within the laundry treatment space.

According to yet another aspect of the present disclosure, an air flow system for an appliance includes a blower that directs process air through an air flow path. A tub defines a laundry treatment space. The air flow path extends through the laundry treatment space and through a rear wall of the tub at an air flow port. A lint filter is positioned within the air flow port. The lint filter captures lint particles on a filter surface that partially defines the laundry treatment space. A fluid spray system extends through the rear wall and directs a flow of fluid along an inside surface of the rear wall and across the filter surface. The fluid spray system directs the flow of fluid generally away from a central axis of the tub and toward an outer edge of the rear wall.

These and other features, advantages, and objects of the present disclosure will be further understood and appreciated by those skilled in the art by reference to the following specification, claims, and appended drawings.

The components in the figures are not necessarily to scale, emphasis instead being placed upon illustrating the principles described herein.

DETAILED DESCRIPTION

The present illustrated embodiments reside primarily in combinations of method steps and apparatus components related to a laundry appliance having a fluid spray system that directs a flow of fluid across a lint filter for separating particulate material from the lint filter. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

Figure 1:
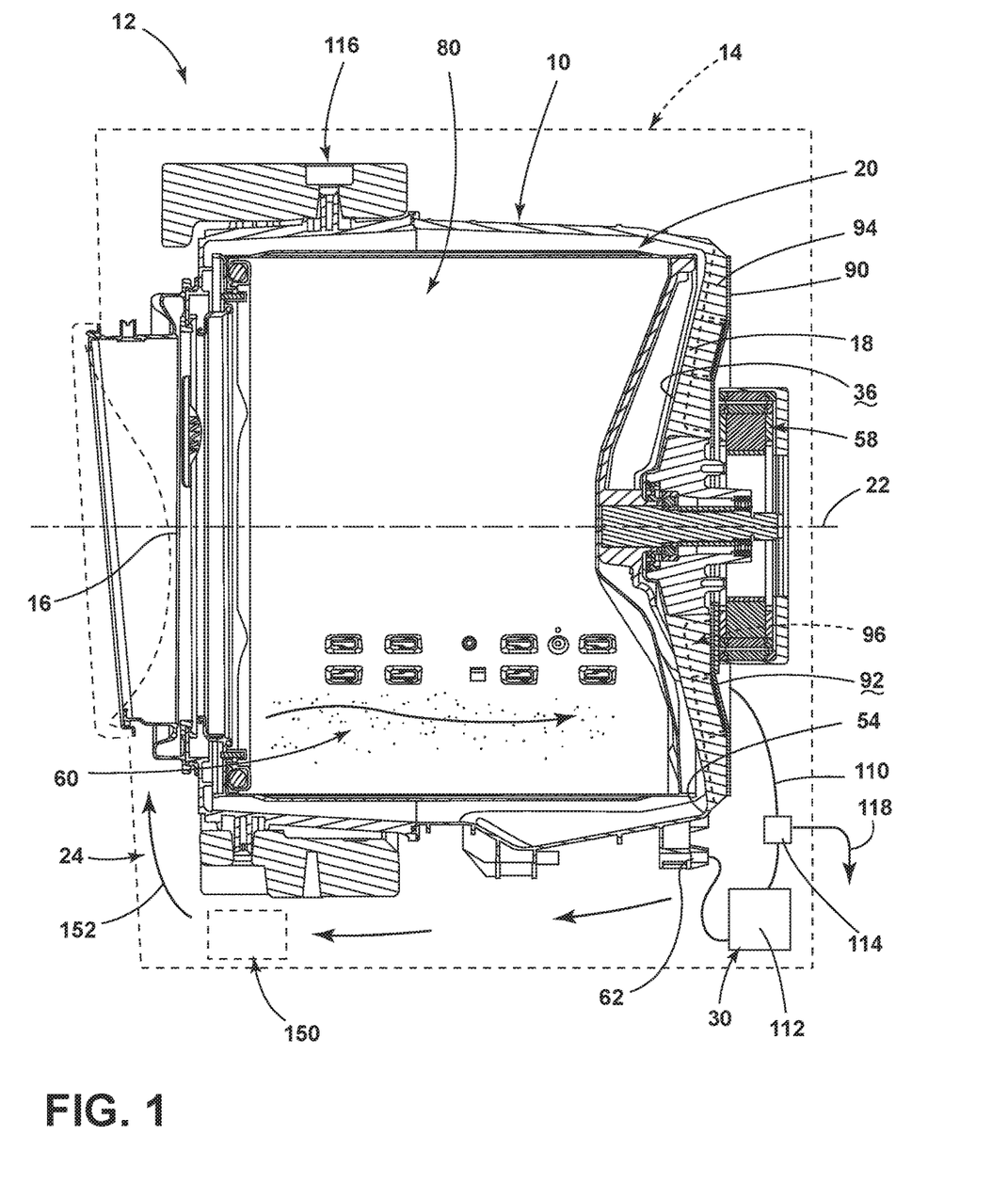
FIG. 1 is a cross-sectional view of an appliance that incorporates an aspect of a fluid spray system.
Figure 2:
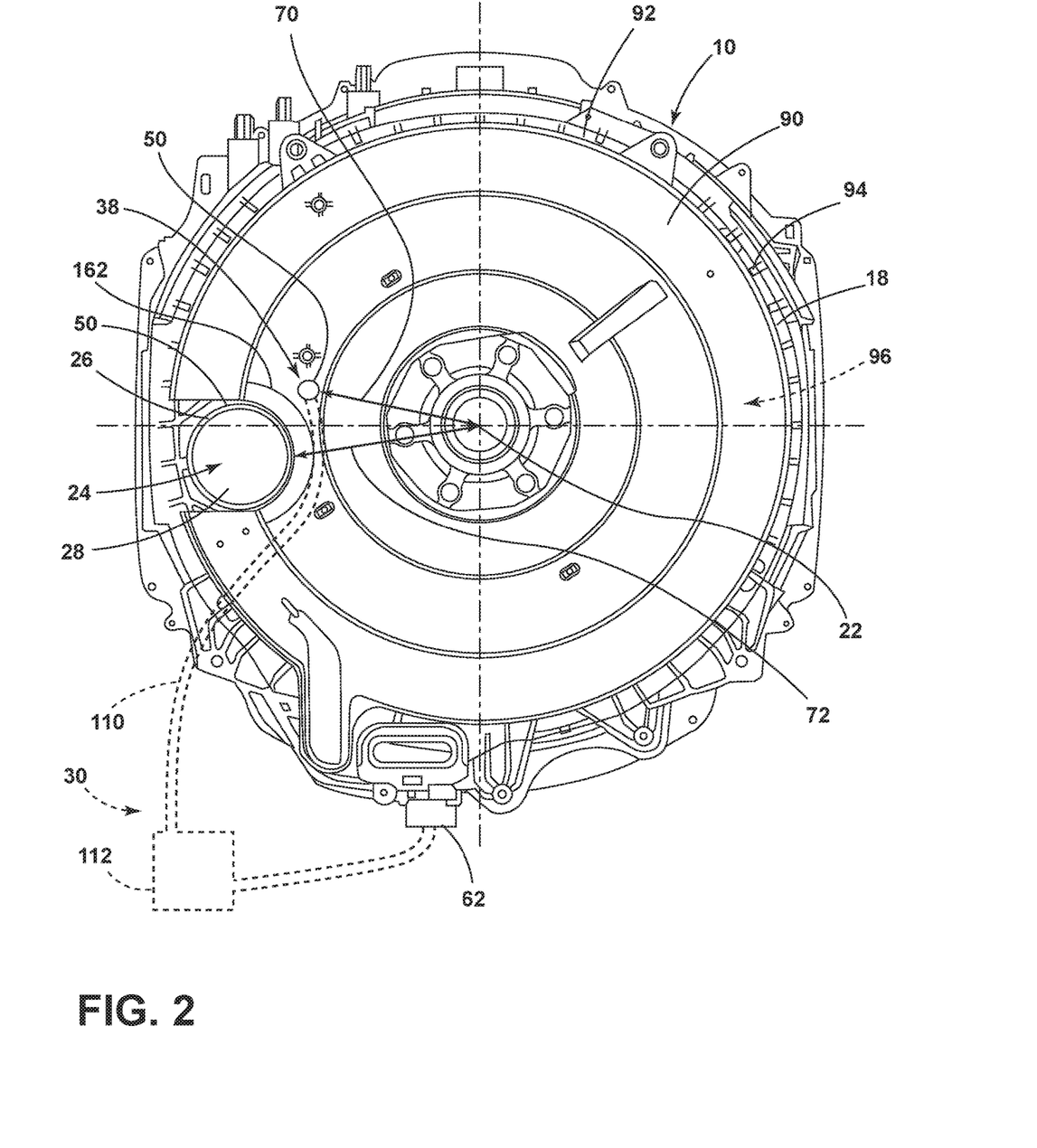
FIG. 2 is a rear elevational view of a tub for an appliance that incorporates an aspect of the fluid spray system.
Figure 3:
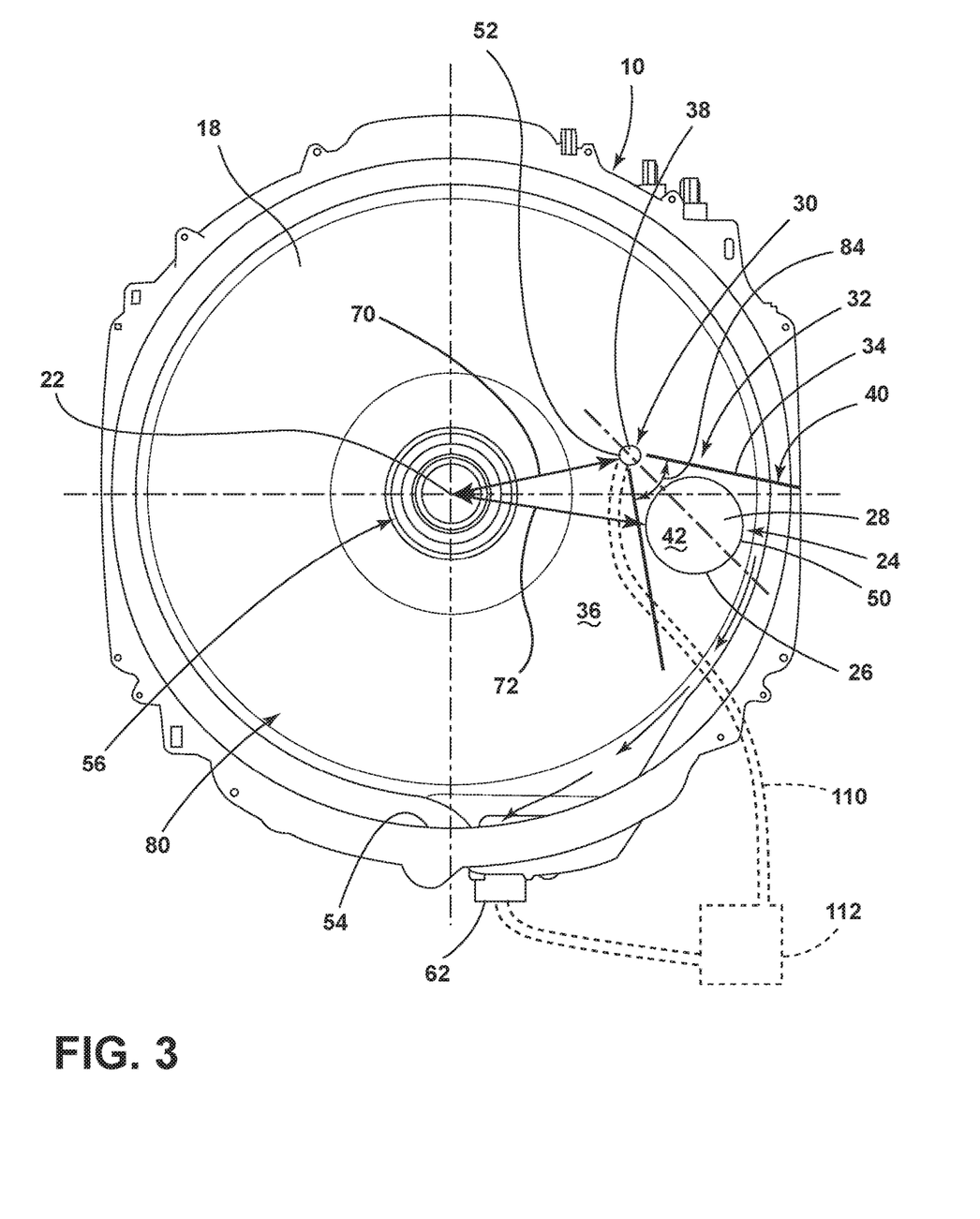
FIG. 3 is a front elevational view of the tub of FIG. 2.
Figure 4:
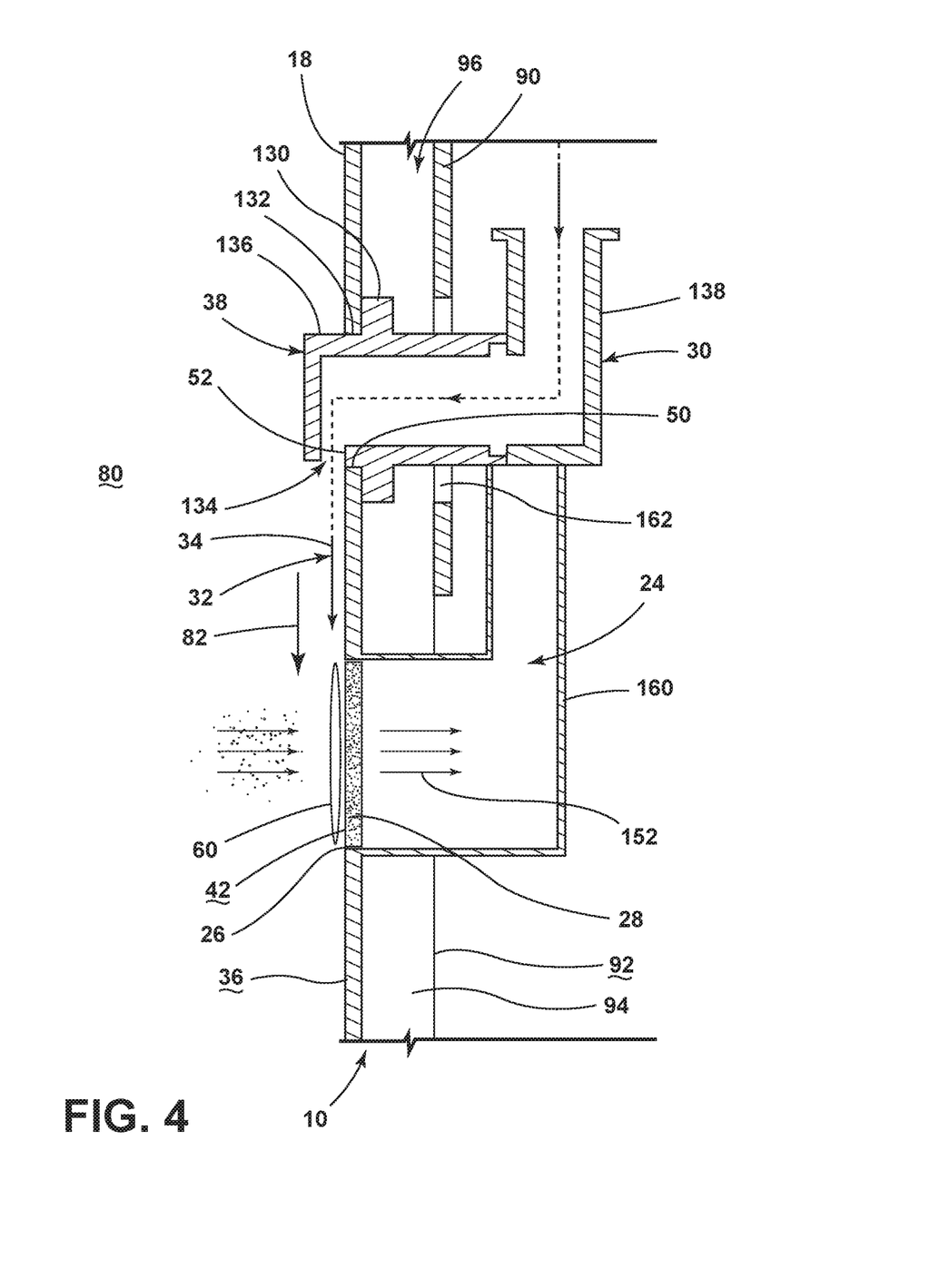
FIG. 4 is a schematic cross-sectional view of an aspect of the fluid spray system and showing movement of the fluid for separating lint particles from a lint filter.
Figure 5:
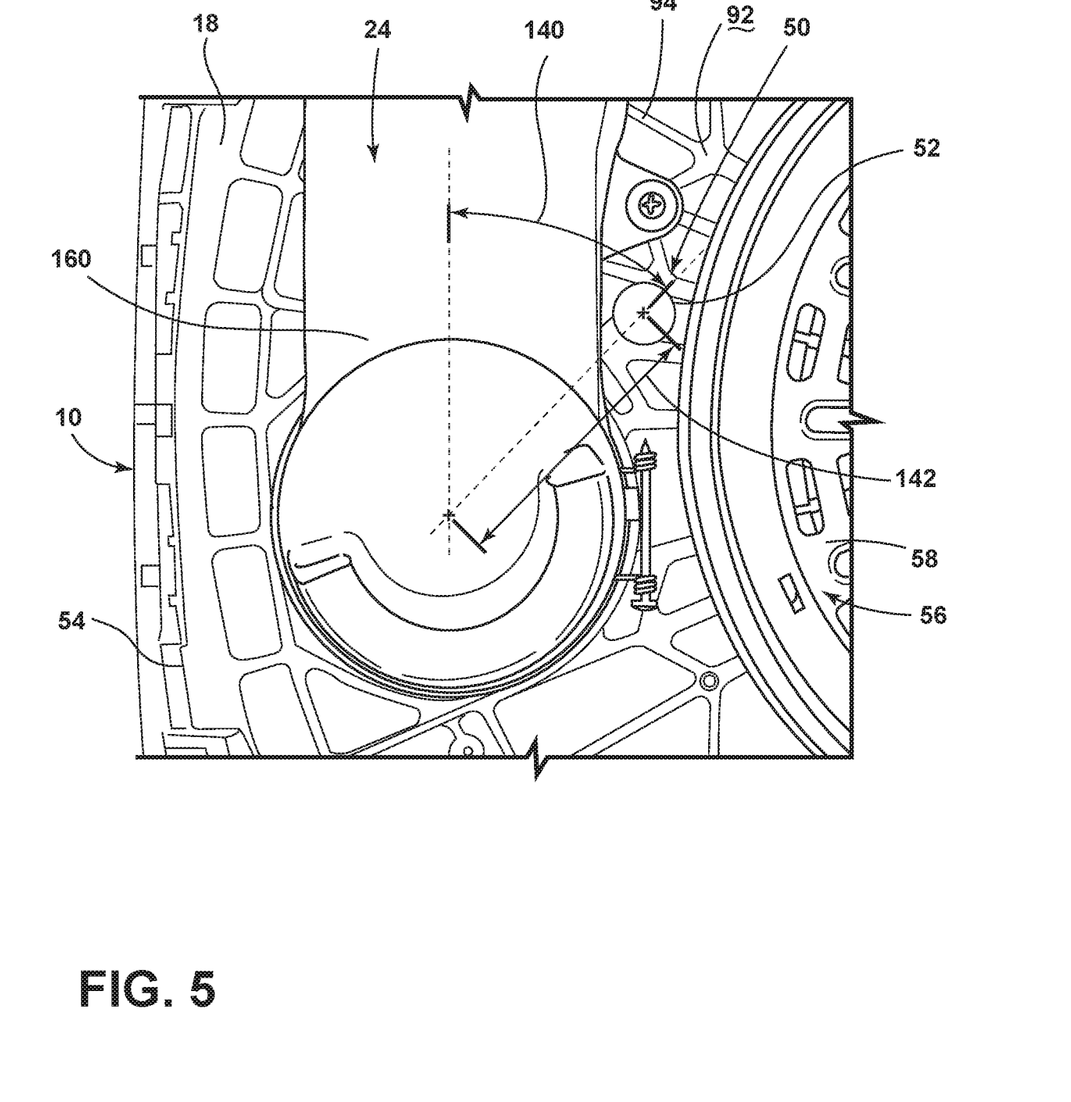
FIG. 5 is a partial elevational view of a tub for an appliance and showing positioning of the air flow and fluid spray systems for the appliance.
Figure 6:
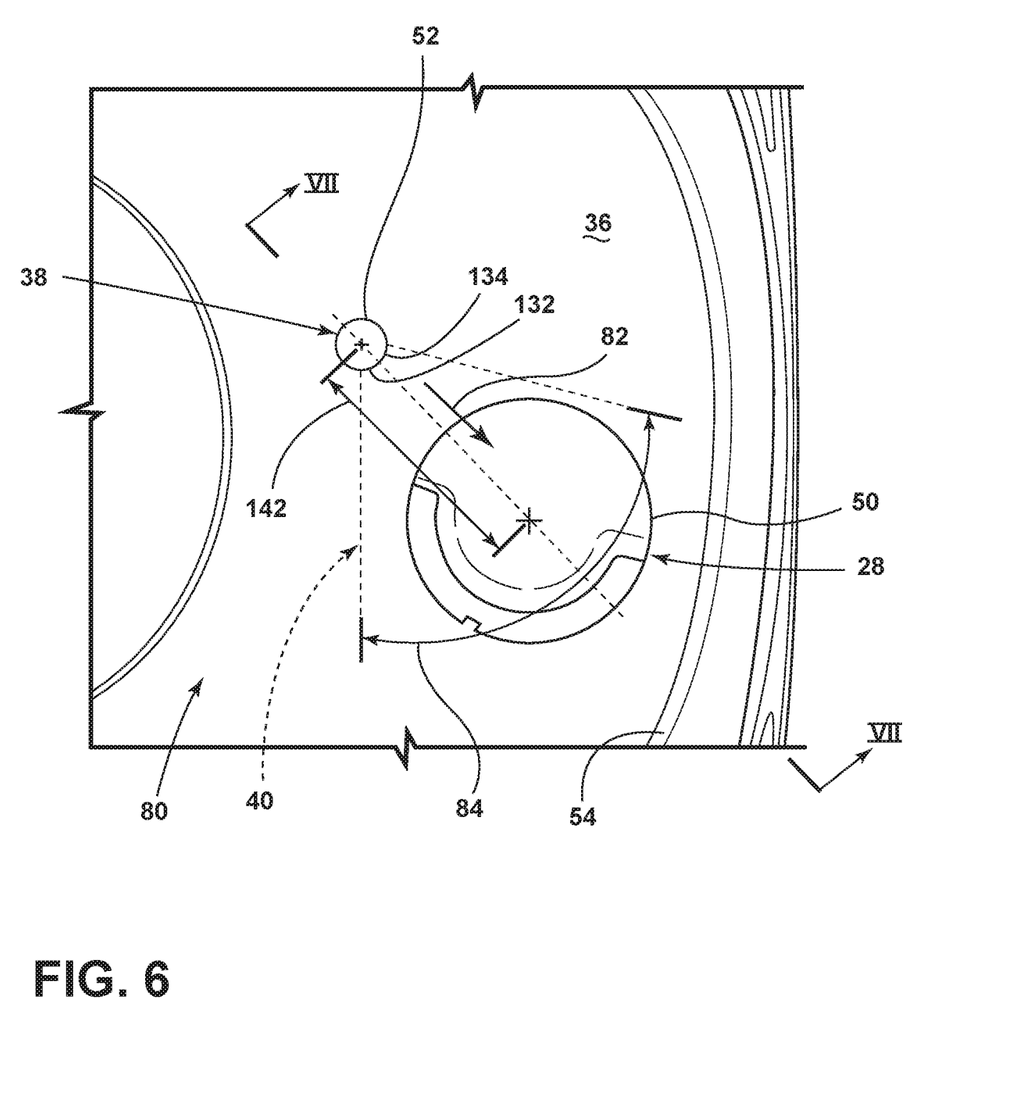
FIG. 6 is a partial elevational view of the tub of FIG. 5.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIGS. 1-7, reference numeral 10 generally refers to a tub for a laundry appliance 12. Typically, the tub 10 is located within a cabinet 14 and defines an aperture 16 that extends through both the cabinet 14 and the tub 10 for locating laundry items within the tub 10 to be processed. According to various aspects of the device, the laundry appliance 12 includes the tub 10, where the tub 10 includes a rear wall 18. A drum 20 is rotationally operable within the tub 10 about a central rotational axis 22. An air flow path 24 extends through an air flow port 26 that is defined within the rear wall 18. A lint filter 28 is positioned within the air flow port 26. A fluid spray system 30 extends through the rear wall 18 and directs a flow 32 of fluid 34 over the air flow port 26 and the lint filter 28. The fluid spray system 30 directs the flow 32 of fluid 34 in a direction generally parallel with an inside surface 36 of the rear wall 18. Typically, the fluid spray system 30 includes a directing nozzle 38 that directs the flow 32 of fluid 34 in a fan-shaped configuration 40 over the air flow port 26. In this manner, the flow 32 of fluid 34 can be directed across the inside surface 36 of the rear wall 18 of the tub 10 and across a filter surface 42 of the lint filter 28. The filter surface 42 of the lint filter 28 can be positioned substantially flush or even with the inside surface 36 of the rear wall 18 of the tub 10 to ensure coverage of the flow 32 of fluid 34 across the filter surface 42.

Referring now to FIGS. 2-7, the directing nozzle 38 of the fluid spray system 30 is attached to the rear wall 18. Additionally, the directing nozzle 38 extends through the rear wall 18 and is positioned adjacent to the air flow port 26. In this manner, the directing nozzle 38 and the air flow port 26 extend through respective utility openings 50 that are each defined through the rear wall 18. Using this configuration, the directing nozzle 38 includes a spray aperture 52 that directs the flow 32 of fluid 34 along the inside surface 36 of the rear wall 18 and toward an outer edge 54 of the rear wall 18. Additionally, the directing nozzle 38 is configured to direct the flow 32 of fluid 34 in a direction that is generally away from the central rotational axis 22 of the drum 20. Accordingly, the flow 32 of fluid 34 from the directing nozzle 38 is directed away from various drive components 56 that extend between a motor 58 of the laundry appliance 12 and the drum 20. This can be done to prevent particulate material 60, such as lint particles, from being pushed by the flow 32 of fluid 34 toward these drive components 56. By directing the flow 32 of fluid 34 and the separated particulate material 60 toward the outer edge 54 of the rear wall 18 of the tub 10, this particulate material 60 can be conveniently directed toward a flow outlet 62 of the tub 10.

Referring again to FIGS. 2-7, in order to achieve the desired direction of the flow 32 of fluid 34, the directing nozzle 38 is positioned a first radial distance 70 from the central rotational axis 22 of the drum 20. The air flow port 26 is positioned a second radial distance 72 from the rotational axis 22 of the drum 20. The first radial distance 70 is less than the second radial distance 72 such that the air flow port 26 is positioned farther from the central rotational axis 22 than the directing nozzle 38. Again, through this positioning, the directing nozzle 38 can direct the flow 32 of fluid 34 away from the drive components 56 that are typically positioned at the central rotational axis 22 of the drum 20.

Referring now to FIGS. 3-7, the directing nozzle 38 is configured to direct a spray of fluid 34 in a fan-shaped configuration 40 within a treatment space 80 that is defined within the tub 10 and across the filter surface 42 of the lint filter 28. Using this fan-shaped configuration 40 of the spray, the directing nozzle 38 can be positioned adjacent to the air flow port 26 to provide the flow 32 of fluid 34 with enough back pressure or pushing force 82 to separate the particulate material 60 from the filter surface 42 of the lint filter 28. The fan-shaped configuration 40 of the spray can be oriented at an angle 140 away from vertical or horizontal, such that the area or spread 84 of the spray captures at least the entire filter surface 42 of the lint filter 28. The shape of the spray that is produced by the directing nozzle 38 can be based upon the spray distance 142 that the directing nozzle 38 resides from the air flow port 26. Accordingly, the spread 84 of the fan-shaped configuration 40 of the spray can be varied as needed for the design of the appliance 12. In addition, the shape of the flow 32 of fluid 34 from the directing nozzle 38 can also vary. In certain instances, the flow 32 of fluid 34 can be a series of streams of the fluid 34, an oscillating flow 32 of fluid 34, a flow 32 of fluid 34 having a consistent width or a narrowing shape, and other similar shapes that can be used to separate the particulate material 60 from the filter surface 42 of the lint filter 28.

Referring again to FIGS. 1-7, a reinforcing panel 90 can be attached to the back surface 92 of the rear wall 18. This reinforcing panel 90 is used to provide additional structural integrity to the components of the tub 10. Typically, the reinforcing panel 90 is attached to structural ribs 94 that extend rearward from the treatment space 80 that is defined by the tub 10. The reinforcing panel 90 attaches to the structural ribs 94 and can define various enclosed shear spaces 96 that provide additional structural integrity to the tub 10 during operation of the laundry appliance 12. Where the reinforcing panel 90 is utilized, the air flow path 24 and the fluid spray system 30 extend through each of the rear wall 18 and the reinforcing panel 90. Accordingly, the air flow port 26 and the directing nozzle 38 are positioned within respective utility openings 50 and extend through each of the rear wall 18 and the reinforcing panel 90.

As exemplified in FIGS. 1-3, the fluid spray system 30 includes a fluid conduit 110 that couples with the directing nozzle 38 and extends from a fluid pump 112. In certain aspects of the device, the fluid pump 112 can be in the form of a recirculation pump that directs fluid 34 from the tub 10 and to the directing nozzle 38, via the recirculation pump. In this manner, the recirculation pump can be used to define the flow 32 of fluid 34 into the tub 10 via the directing nozzle 38 of the fluid spray system 30. Typically, the fluid pump 112 will include one or more diverter valves 114 that are used to direct the fluid 34 to various spray components 116 that are positioned within and around the tub 10 for the appliance 12. It is also contemplated that the fluid spray system 30 can include a dedicated pump that provides fluid 34 to the directing nozzle 38 of the fluid spray system 30. The diverter valve 114 can also direct the fluid 34 to a drain outlet 118 that leads to an exterior drain or a removable bottle.

Referring again to FIGS. 1-7, the laundry appliance 12 includes the tub 10 that defines the laundry treatment space 80 and includes the rear wall 18. The air flow path 24 extends from the tub 10 and through the air flow port 26 that is defined within the rear wall 18 of the tub 10. The lint filter 28 is disposed within the air flow path 24 and entraps particulate material 60, such as particles of lint. The fluid spray system 30 extends through the rear wall 18 and directs a flow of fluid 34 along an inside surface 36 of the rear wall 18. This flow 32 of fluid 34 also extends across a filter surface 42 of the lint filter 28 to separate the particulate matter from the lint filter 28. The flow 32 of fluid 34 and the separated particulate material 60 are disposed within the laundry treatment space 80. This flow 32 of fluid 34 and the particulate material 60 can be removed from the tub 10 via the flow outlet 62. As discussed above, the fluid spray system 30 includes the directing nozzle 38 that directs the fan-shaped configuration 40 of the spray of fluid 34 within the treatment space 80 of the tub 10. This spray of the fluid 34 is also directed across the filter surface 42 of the lint filter surface 42 of the lint filter 28 to separate the particulate material 60 from the lint filter 28.

Referring now to FIGS. 4-7, the directing nozzle 38 can be attached to the rear wall 18 of the tub 10 via an attachment flange 130. This attachment flange 130 can engage the rear wall 18 of the tub 10 at a fluid opening 132, being one of the utility openings 50. The fluid opening 132 and the attachment flange 130 cooperate to position the spray aperture 52 in a close engagement with the inside surface 36 of the rear wall 18 of the tub 10. This close engagement can define the size of the spray aperture 52.

Typically, the spray aperture 52 will include a narrow slot 134 within the directing nozzle 38. This narrow slot 134 can be used to define the fan-shaped configuration 40 of the spray and also to define a particular pressure or pushing force 82 of the spray as it moves across the filter surface 42 of the lint filter 28. The directing nozzle 38 can include a body portion 136 that extends through the reinforcing panel 90 and the rear wall 18 of the tub 10. An attachment portion 138 can extend from the body portion 136 and can be used to engage the fluid conduit 110 that extends from the fluid pump 112, or other fluid directing mechanism. Using these components, the directing nozzle 38 can be positioned in a close engagement with each of the rear wall 18 of the tub 10 and the reinforcing panel 90 to minimize the amount of space needed for use of the directing nozzle 38 of the fluid spray system 30. Additionally, the positioning of the directing nozzle 38 between the air flow port 26 and the drive components 56 of the drum 20 allows the fan-shaped configuration 40 of the spray of the fluid 34 to be directed at an angle 140 and away from the drive components 56 and toward the outer edge 54 of the rear wall 18 of the tub 10. As discussed above, this configuration of the directing nozzle 38 promotes the flow 32 of the fluid 34 and the movement of particulate material 60 toward the outer edge 54 of the rear wall 18 and away from the drive components 56. In addition, the flow 32 of fluid 34 is generally in a direction of the flow outlet 62 of the tub 10 to promote expedient removal of the flow 32 of fluid 34 and a particulate material 60 from the tub 10.

Referring again to FIGS. 2-7, an air flow system for an appliance 12 includes a blower 150 that directs process air 152 through the air flow path 24. The tub 10 defines the laundry treatment space 80. The air flow path 24 extends through the laundry treatment space 80 and through the rear wall 18 of the tub 10 at the air flow port 26. The lint filter 28 is positioned within the air flow port 26. The lint filter 28 captures particulate material 60, such as lint particles, on a filter surface 42 that partially defines the laundry treatment space 80. The fluid spray system 30 extends through the rear wall 18 of the tub 10 and directs the flow 32 of fluid 34 along the inside surface 36 of the rear wall 18. The fluid spray system 30 also directs the flow 32 of fluid 34 across the filter surface 42 of the lint filter 28. The fluid spray system 30 directs the flow 32 of fluid 34 generally away from the central rotational axis 22 of the drum 20 and toward the outer edge 54 of the rear wall 18. The reinforcing panel 90 can be attached to the back surface 92 of the rear wall 18. Where the reinforcing panel 90 is implemented, the air flow port 26 and the directing nozzle 38 of the fluid spray system 30 each extend through the reinforcing panel 90 and the rear wall 18 at respective utility openings 50.

Referring now to FIGS. 2-7, the air flow path 24 for the appliance 12 can include an air flow duct 160 that is coupled with the rear wall 18 of the tub 10. Typically, the reinforcing panel 90 includes a clearance opening 162 that is larger than the air flow port 26. In such a configuration, the air flow duct 160 is set apart from the reinforcing panel 90. The air flow duct 160 extends rearward of the air filter that is defined within the air flow port 26. The fluid spray system 30 and the directing nozzle 38 are positioned to be between the air flow duct 160 and the drive components 56 that are coupled with the rear wall 18 of the tub 10. Accordingly, limited amounts of space are available for locating the directing nozzle 38 of the fluid spray system 30. Using the configuration of the directing nozzle 38, the fluid spray system 30 can be positioned near the air flow port 26 for providing an efficient mechanism for separating the particulate material 60 from the filter surface 42. By positioning the directing nozzle 38 close to the lint filter 28, the pushing force 82 of the spray can be consistently maintained as it leaves the directing nozzle 38 and moves across the filter surface 42 of the lint filter 28. Accordingly, the separation of particulate material 60 from the filter surface 42 is accomplished in a consistent and repeatable manner over the life of the appliance 12.

Referring again to FIGS. 2-7, the orientation of the inside surface 36 of the rear wall 18 at the directing nozzle 38 and the air flow port 26 may not be vertical. Additionally, the orientation of the inside surface 36 of the rear wall 18 at the directing nozzle 38 may be different than the orientation of the inside surface 36 at the air flow port 26. Accordingly, the close positioning of the slot 134 defined by the spray aperture 52 of the directing nozzle 38 with the inside surface 36 of the rear wall 18 allows the flow 32 of fluid 34 to use surface adhesion to maintain engagement with the rear wall 18 of the tub 10. Using this surface adhesion, the flow 32 of fluid 34 across the inside surface 36 of the rear wall 18 can be maintained across the filter surface 42 of the lint filter 28, without a significant loss in pushing force 82. Because the directing nozzle 38 is positioned at the spray distance 142 in close proximity to the air flow port 26, the combination of surface adhesion and the fan-shaped configuration 40 of the fluid 34 provides for the consistent and repeatable process for removing particulate material 60 from the filter surface 42 of the lint filter 28.

Figure 7:
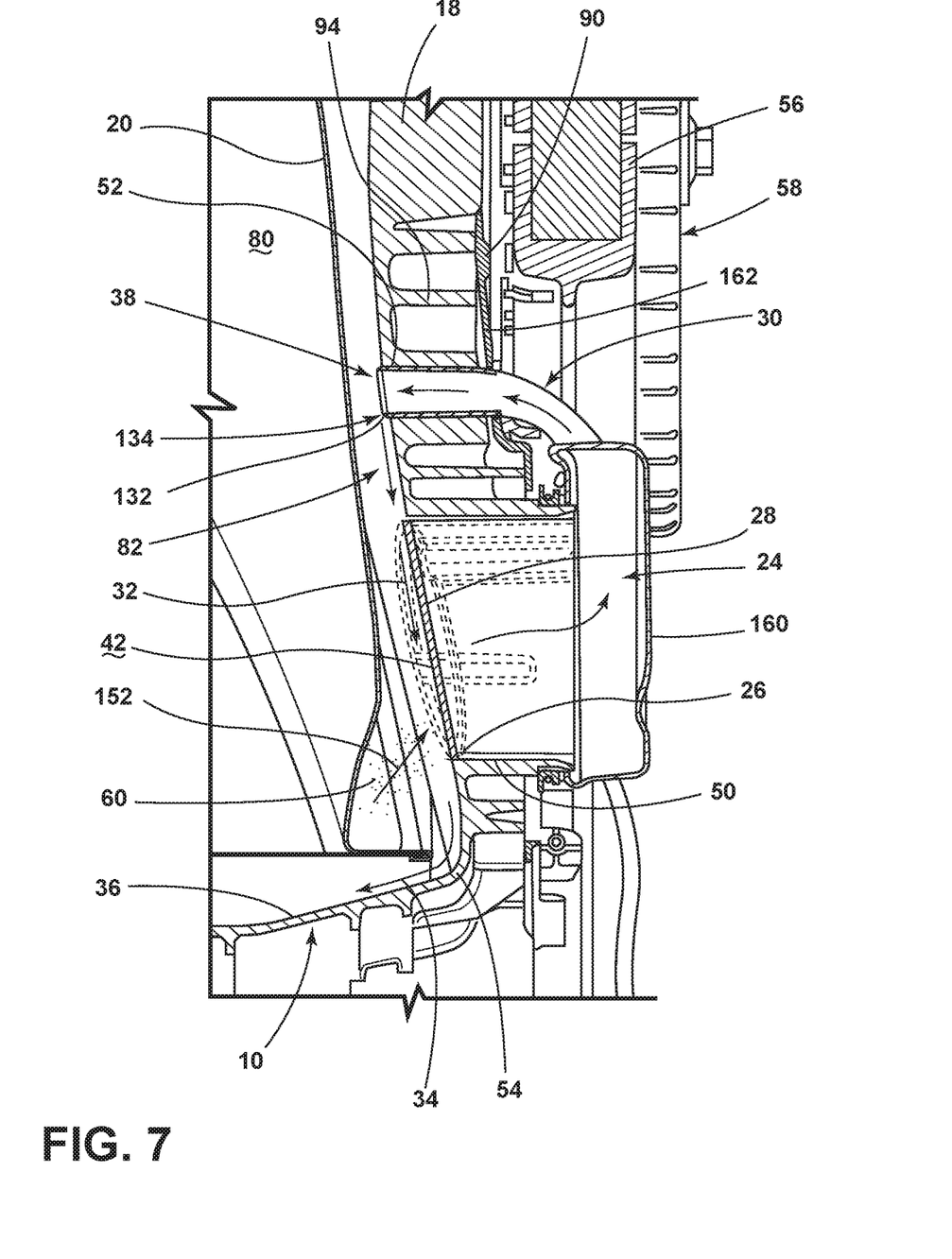
FIG. 7 is a cross-sectional view of the tub of FIG. 6, taken along line VII-VII.

Referring now to FIG. 7, each of the directing nozzle 38 of the fluid spray system 30 and the air flow port 26 can be positioned between structural ribs 94 that are defined within the rear wall 18 of the tub 10. Accordingly, these structural ribs 94 can be used as a locating feature for installing components of the air flow path 24 and the directing nozzle 38 into the rear wall 18 of the tub 10. Additionally, it is contemplated that the reinforcing panel 90 that is attached to the rear wall 18 is sized to allow for removal of components for servicing, maintenance and replacement of the various components of the air flow path 24 and the fluid spray system 30. Accordingly, components of the fluid spray system 30 and the air flow path 24 will typically be attached to either the rear wall 18 of the tub 10 or the reinforcing panel 90. It is contemplated that in certain instances, components of the air flow path 24 and the fluid spray system 30 can be attached to both of the reinforcing panel 90 and the rear wall 18 of the tub 10.

As exemplified in FIGS. 1-7, the fluid spray system 30 and the air flow path 24 described herein are typically incorporated within horizontal axis laundry appliances 12. These laundry appliances 12 can include washers, combination washers and dryers, dryers, appliances having a horizontal axis drum 20, appliances having an angled rotational axis 22, and other similar laundry appliances. It is also contemplated that the fluid spray system 30 incorporated herein can be utilized within any one of various appliances that require separation of particulate material 60 from a filter surface 42.

According to another aspect of the present disclosure, a laundry appliance includes a tub having a rear wall. A drum is rotationally operable within the tub. An air flow path extends through an air flow port defined within the rear wall. A lint filter is positioned within the air flow port. A fluid spray system extends through the rear wall and directs a flow of fluid over the air flow port and the lint filter in a direction generally parallel with an inside surface of the rear wall.

According to another aspect, the fluid spray system includes a directing nozzle that directs the flow of fluid in a fan-shaped configuration over the air flow port.

According to yet another aspect, the directing nozzle is attached through the rear wall and is positioned adjacent to the air flow port.

According to another aspect of the present disclosure, a reinforcing panel is attached to a back surface of the rear wall, wherein the air flow path and the fluid spray system extend through the rear wall and the reinforcing panel.

According to another aspect, the air flow port and the directing nozzle extend through the rear wall and the reinforcing panel.

According to yet another aspect, the directing nozzle includes a spray aperture that directs the fluid along the inside surface of the rear wall and toward an outer edge of the rear wall.

According to another aspect of the present disclosure, the directing nozzle is positioned a first radial distance from a rotational axis of the drum and the air flow port is positioned a second radial distance from the rotational axis, wherein the first radial distance is less than the second radial distance.

According to another aspect, the directing nozzle directs the flow of fluid generally away from the rotational axis.

According to yet another aspect, the directing nozzle couples with a fluid conduit that extends from a fluid pump.

According to another aspect of the present disclosure, the fluid pump is a recirculation pump that directs fluid from the tub and to the directing nozzle to define the flow of the fluid into the tub.

According to another aspect, a laundry appliance includes a tub that defines a laundry treatment space and includes a rear wall. An air flow path extends from the tub and through an air flow port defined within the rear wall of the tub. A lint filter is disposed within the air flow path that entraps particles of lint. A fluid spray system extends through the rear wall and directs a flow of fluid along an inside surface of the rear wall and across a surface of the lint filter to separate particles of lint from the lint filter and dispose the particles of lint within the laundry treatment space.

According to yet another aspect, the fluid spray system includes a directing nozzle that directs a fan-shaped spray of the fluid within the treatment space and across the surface of the lint filter.

According to another aspect of the present disclosure, a reinforcing panel is attached to a back surface of the rear wall, and wherein the air flow port and the directing nozzle extend through each of the reinforcing panel and the rear wall.

According to another aspect, the directing nozzle and the air flow port extend through respective apertures that are each defined through the rear wall.

According to yet another aspect, the directing nozzle directs the flow of the fluid in a direction that is generally away from a central axis extending through the treatment space.

According to another aspect of the present disclosure, the fluid is recirculated from the tub, through a fluid pump, wherein the fluid pump recirculates at least a portion of the fluid to the directing nozzle.

According to another aspect, an air flow system for an appliance includes a blower that directs process air through an air flow path. A tub defines a laundry treatment space. The air flow path extends through the laundry treatment space and through a rear wall of the tub at an air flow port. A lint filter is positioned within the air flow port. The lint filter captures lint particles on a filter surface that partially defines the laundry treatment space. A fluid spray system extends through the rear wall and directs a flow of fluid along an inside surface of the rear wall and across the filter surface.

The fluid spray system directs the flow of fluid generally away from a central axis of the tub and toward an outer edge of the rear wall.

According to yet another aspect, a reinforcing panel is attached to a back surface of the rear wall. The air flow port and the fluid spray system extend through each of the reinforcing panel and the rear wall.

According to another aspect of the present disclosure, the fluid spray system includes a directing nozzle that is coupled with the rear wall and extends through each of the rear wall and the reinforcing panel.

According to another aspect, the air flow port and the directing nozzle are positioned within respective apertures that are defined through each of the rear wall and the reinforcing panel.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A laundry appliance comprising:
   a tub having a rear wall;
   a drum that is rotationally operable within the tub;
   an air flow path that extends through an air flow port defined within the rear wall, wherein a lint filter is positioned within the air flow port;
   a fluid spray system that extends through the rear wall and directs a flow of fluid over the air flow port and the lint filter in a direction generally parallel with an inside surface of the rear wall, wherein the fluid spray system includes a directing nozzle that directs the flow of fluid in a fan-shaped configuration over the air flow port; and
   a reinforcing panel attached to a back surface of the rear wall, wherein the air flow path and the fluid spray system extend through the rear wall and the reinforcing panel, wherein the directing nozzle extends through a utility opening of the reinforcing panel and a fluid opening of the rear wall, and wherein the utility opening and the fluid opening are concentric with respect to the directing nozzle.

2. The laundry appliance of claim 1, wherein the directing nozzle is attached through the rear wall and is positioned adjacent to the air flow port.

3. The laundry appliance of claim 1, wherein the air flow port and the directing nozzle extend through the rear wall and the reinforcing panel.

4. The laundry appliance of claim 1, wherein the directing nozzle includes a spray aperture that directs the fluid along the inside surface of the rear wall and toward an outer edge of the rear wall.

5. The laundry appliance of claim 1, wherein the directing nozzle is positioned a first radial distance from a rotational axis of the drum and the air flow port is positioned a second radial distance from the rotational axis, wherein the first radial distance is less than the second radial distance.

6. The laundry appliance of claim 5, wherein the directing nozzle directs the flow of fluid generally away from the rotational axis.

7. The laundry appliance of claim 1, wherein the directing nozzle couples with a fluid conduit that extends from a fluid pump.

8. The laundry appliance of claim 7, wherein the fluid pump is a recirculation pump that directs fluid from the tub and to the directing nozzle to define the flow of the fluid into the tub.

9. A laundry appliance comprising:
   a tub that defines a laundry treatment space and includes a rear wall;
   an air flow path that extends from the tub and through an air flow port defined within the rear wall of the tub;
   a lint filter disposed within the air flow path that entraps particles of lint; and
   a fluid spray system that extends through the rear wall and directs a flow of fluid along an inside surface of the rear wall and across a surface of the lint filter to separate particles of lint from the lint filter and dispose the particles of lint within the laundry treatment space, wherein the fluid spray system includes a directing nozzle that directs a fan-shaped spray of the fluid within the laundry treatment space and across the surface of the lint filter, and wherein a reinforcing panel is attached to a back surface of the rear wall, and wherein the air flow port and the directing nozzle extend through each of a of the reinforcing panel and a fluid opening of the rear wall, wherein the utility opening and the fluid opening are concentric with and are in a close engagement with the directing nozzle.

10. The laundry appliance of claim 9, wherein the directing nozzle directs the flow of the fluid in a direction that is generally away from a central axis extending through the laundry treatment space.

11. The laundry appliance of claim 9, wherein the fluid is recirculated from the tub, through a fluid pump, wherein the fluid pump recirculates at least a portion of the fluid to the directing nozzle.

12. An air flow system for an appliance, the air flow system comprising:
   a blower that directs process air through an air flow path;
   a tub that defines a laundry treatment space, wherein the air flow path extends through the laundry treatment space and through a rear wall of the tub at an air flow port;
   a lint filter positioned within the air flow port, wherein the lint filter captures lint particles on a filter surface that partially defines the laundry treatment space; and
   a fluid spray system that extends through the rear wall and directs a flow of fluid along an inside surface of the rear wall and across the filter surface, wherein a directing nozzle of the fluid spray system directs the flow of fluid generally away from a central axis of the tub and toward an outer edge of the rear wall, wherein a reinforcing panel is attached to a back surface of the rear wall, and wherein the air flow port and the directing nozzle extend through each of the reinforcing panel and the rear wall, wherein the directing nozzle extends through a utility opening of the reinforcing panel and a fluid opening of the rear wall, and wherein the utility opening and the fluid opening are in a close engagement with the directing nozzle.

13. The air flow system of claim 12, wherein the directing nozzle is coupled with the rear wall and extends through each of the rear wall and the reinforcing panel.

* * * * *